United States Patent [19]

Savage et al.

[11] Patent Number: 4,731,515

[45] Date of Patent: Mar. 15, 1988

[54] METHOD OF MAKING POWDERS BY ELECTRO-DISCHARGE MACHINING IN A CRYOGENIC DIELECTRIC

[75] Inventors: Steven J. Savage, Stockholm, Sweden; C. Edward Harper, Jr., Fairborn, Ohio

[73] Assignee: Systems Research Laboratories, Inc., Dayton, Ohio

[21] Appl. No.: 921,708

[22] Filed: Oct. 22, 1986

[51] Int. Cl.$^4$ .......................... B23H 1/00; B23H 1/08
[52] U.S. Cl. .................................. 219/69 M; 204/164; 219/69 D
[58] Field of Search ........................ 219/69 D, 69 M; 204/164, 165

[56] References Cited

U.S. PATENT DOCUMENTS

| | | | |
|---|---|---|---|
| 2,427,588 | 9/1947 | Burnett | 219/69 E |
| 3,553,415 | 1/1971 | Girard | 219/69 D |
| 4,416,751 | 11/1983 | Berkowitz et al. | 204/165 |
| 4,488,031 | 12/1984 | Roberts | 219/69 R |
| 4,490,601 | 12/1984 | Yokoyama | 219/69 R |
| 4,491,714 | 1/1985 | Inoue | 219/69 D |

FOREIGN PATENT DOCUMENTS

| | | | |
|---|---|---|---|
| 1326482 | 3/1962 | France | 219/69 D |
| 58-10429 | 1/1983 | Japan | 219/69 D |
| 59-73236 | 4/1984 | Japan | 219/69 D |
| 2002208 | 2/1979 | United Kingdom | 204/164 |

OTHER PUBLICATIONS

Article entitled "Initiation of ZrC Dendritic Growth on the Surface of Spark Machined Zirconium," by J. D. Ayers, Metallurgical Transactions A, vol. 14A, Jan. 1983, pp. 5–10.

Article entitled "Formation of Metal Carbide Powder by Spark Machining of Reactive Metals," by J. D. Ayers and Kathy Moore, Metallurgical Transactions A, vol. 15A, Jun. 1984, pp. 1117–1127.

*Primary Examiner*—A. D. Pellinen
*Assistant Examiner*—Geoffrey S. Evans
*Attorney, Agent, or Firm*—Biebel, French & Nauman

[57] ABSTRACT

Powders, and particularly metallic powders, are produced by electro-discharge machining of electrically conductive electrodes made of the desired materials in a cryogenic dielectric. When a sufficient quantity of powder has been produced, the cryogenic dielectric is allowed to evaporate, leaving the powders available for recovery. Powders formed by this process have unique microstructures, and thus unique properties, as a result of rapid cooling in the cryogenic medium. By using an inert cryogenic dielectric, such as argon, powders uncontaminated by the dielectric are produced.

7 Claims, 7 Drawing Figures

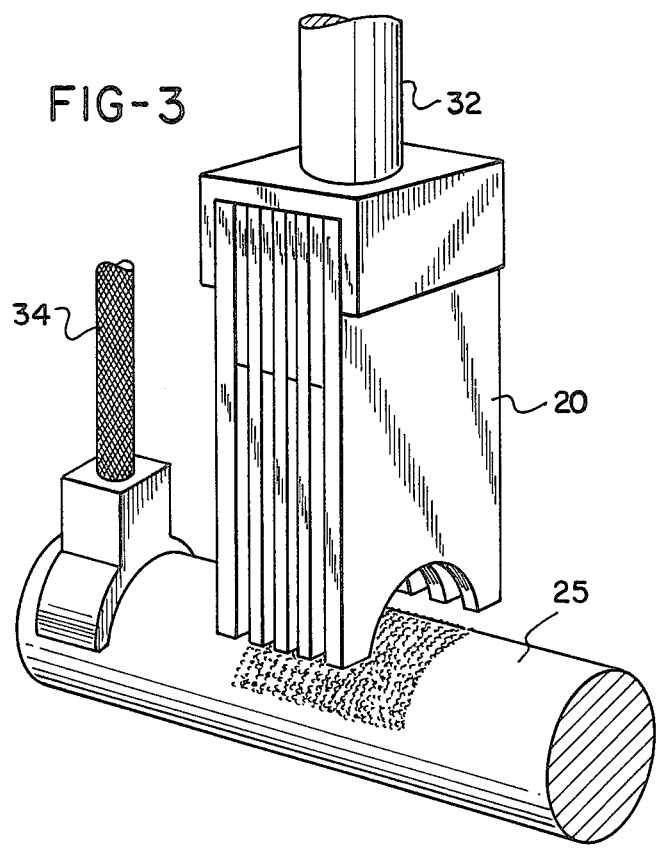

METHOD OF MAKING POWDERS BY ELECTRO-DISCHARGE MACHINING IN A CRYOGENIC DIELECTRIC

The U.S. Government has a paid-up license in this invention and the right in limited circumstances to require the patent owner to license others on reasonable terms as provided for by the terms of Contract No. F33615-80-5079 awarded by The Department of the Air Force.

BACKGROUND OF THE INVENTION

This invention relates to a process for producing powders, and particularly metal powders, by electro-discharge machining.

Electro-discharge machining techniques have been used for many years to produce small diameter metallic powders. These prior art processes for creating powders involve immersing electrodes formed of the materials to be made into powder in an organic dielectric and by applying sufficient electrical energy to the electrodes while maintaining a gap between them to cause arcing, thereby eroding the electrodes and producing the powder. Typical dielectrics include kerosene, toluene, alcohol, benzenes, silicone oil and water. These organic dielectric fluids used in the machining process may react with the eroded materials in some way, such as by a chemical reaction, or by coating the individual particles.

It is sometimes desirable to produce uncontaminated powders or powders which have a desirable and unique microstructure. It is also desirable to produce powders that may be recovered and easily separated from the dielectric material.

SUMMARY OF THE INVENTION

This invention employs an electro-discharge machine in a process for producing powders in a cryogenic dielectric. The electrodes are formed of the materials to be reduced to powder form. These materials can be of any substance as long as they are electrically conductive. The cryogenic material can either be inert or reactive, depending upon the desired product.

After a sufficient amount of powder has been generated, the dielectric is allowed to evaporate. Thus, the powders are easily recovered.

Since the powders are formed in a cryogenic dielectric, they cool rapidly, resulting in powders having unique and desirable microstructures.

Powders formed from this process have many applications, such as magnetic materials for use in ferro fluids, magnetic materials for use on magnetic tapes, and powders for use in special metallurgical environments.

Any type of electrically conductive material can be formed into a powder by this process. Pure metallic powders would be formed by using an inert cryogenic dielectric, such as liquid argon. Compounds may also be formed by using a reactive cryogenic dieletric. For example, when using titanium electrodes, and a liquid nitrogen dielectric, approximately 15% nitrogen is introduced into the compound thereby producing $Ti_2N$, an abrasive and/or wear resistant material. Liquid oxygen could be used as the dielectric when oxide compounds of the powder are desired. The size and characteristics of the powder are controlled by the electro-discharge machine parameters including gap distance, frequency, pulse shape duty cycle and the like Accordingly, it is an object of this invention to provide an improved method for making powders using a cryogenic dielectric in an electro-discharge machine; to provide a process for manufacturing uncontaminated metal powders through the electro-discharge machining process by using an inert cryogenic dielectric; and to produce metal powders having unique microstructures due to the rapid cooling caused by the cryogenic dielectric.

Other objects and advantages of the invention will be apparent from the following description, the accompanying drawings and the appended claims.

BRIEF DESCRIPTION OF THE DRAWINGS

FIG. 3 is a perspective view showing the structure and relationship of the electrode used in a preferred embodiment of this invention.

DESCRIPTION OF THE PREFERRED EMBODIMENT

Figure 1:
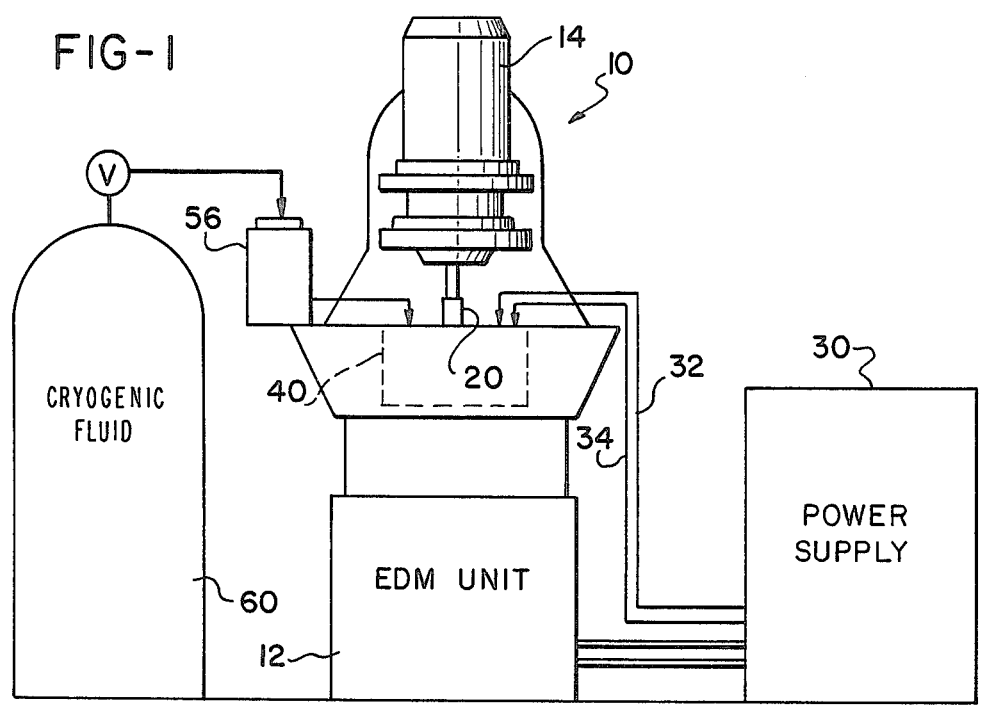
FIG. 1 is a pictorial view showing the basic components of an electro-discharge machining process.
Figure 2:
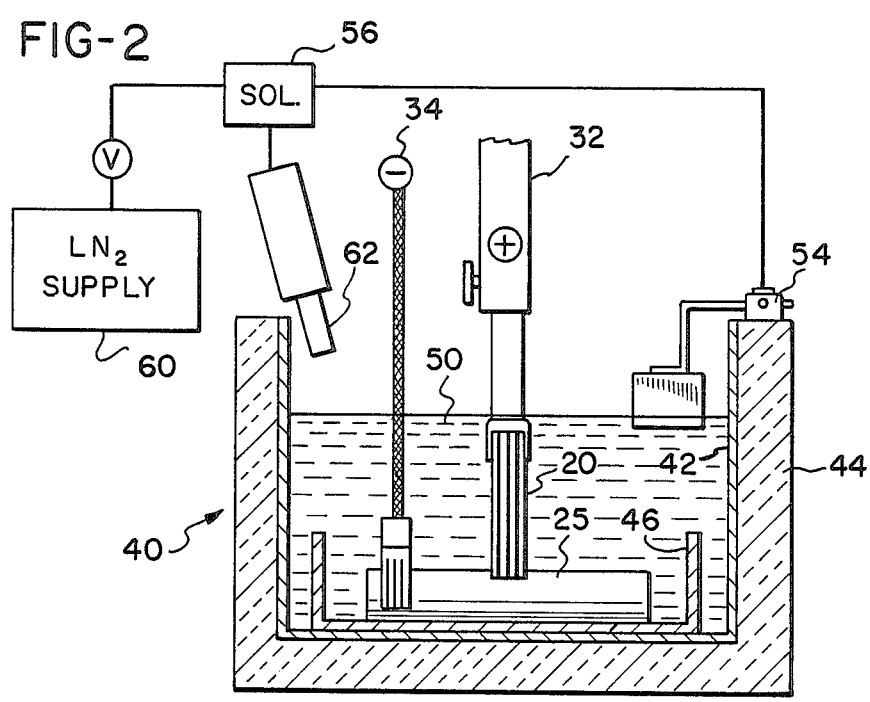
FIG. 2 is a view, partly in cross-section, showing the electrodes immersed in a cryogenic bath.

Reference is now made to the drawings which show a preferred embodiment of the invention, and particularly to FIG. 1. An electro-discharge machine, shown generally at 10, includes a base 12 supporting a hydraulic cylinder 14. This cylinder controls the vertical position of a movable electrode 20 relative to a workpiece 25 (FIG. 2). A power supply 30 is connected to electrodes 20 and 25 by cables 32 and 34.

The electrodes 20 and 25 are immersed in a cryogenic dielectric bath contained in vessel 40. As shown in FIG. 2, this vessel is formed from several components including an aluminum liner 42 surrounded by a layer of styrofoam insulation 44. The metal powders formed by the process are retained in a stainless steel collection container 46 placed within the vessel.

The cryogenic fluid 50 within the vessel is maintained at a predetermined level by means of a float 52 mechanically connected to a float switch 54 which in turn is electrically connected to a solenoid 56. Lowering of the dielectric level due to evaporation will cause the float 52 to lower, the switch 54 to close, the solenoid 56 to open and the dielectric to be replenished from a supply source 60 through a nozzle 62.

The physical arrangement of the components shown in FIGS. 2 and 3 are merely representative of one way in which the powders can be formed by electro-discharge machining A typical electro-discharge machining (EDM) device, such as the South Bend-Ingersol Model 1000, also includes means for maintaining a constant gap distance between the electrode and the workpiece as the machining process erodes away the material from both electrodes.

In a normal EDM process, it is desired to erode material from the workpiece while leaving the electrodes substantially unchanged. In the process according to this invention, however, both the tool and the workpiece may be treated as the electrodes, and either or both may be eroded since the object is to create powder, not to form a shape on or in the workpiece.

The Model 1000 EDM device is provided with a control panel having thereon a volt meter, an ammeter, and various controls for gap, servo, frequency, duty cycle, cutting mode, and the value of the capacitance used when in the capacitor mode.

The gap control varies a reference voltage within the power supply to which the voltage at the gap is compared. The gap is then adjusted by a servo valve within the machine, which controls the hydraulic cylinder 14, until the voltage at the gap is equal to this reference voltage. The gap voltage is determined by the width of the gap; the greater the gap, the greater will be the voltage build up before a discharge occurs. The gap control is calibrated in arbitrary terms from 1 to 10 with the setting of 1 being minimum, and a setting of 10 being maximum. The actual voltage at the gap may be read by the volt meter.

The servo control determines the response speed of the electrode positioning mechanism to maintain the gap. If the response speed is too slow, cutting time will be reduced since the electrode cannot keep up with the erosion of material from the workpiece. If the response speed is too fast, the electrode will overrun and may contact the workpiece, resulting in a short circuit. The servo control is also calibrated in arbitrary terms from 1 to 10, with the setting of 10 giving the fastest response speed.

The frequency selector controls the frequency of the pulses delivered to the gap. The frequency may be varied from 0.4 (400 pulses per second) to 200 (200,000 pulses per second).

The duty cycle selector controls the ratio of on-time to the total pulse length. This dial has arbitrary calibrations from 0 to 10, and the duty cycle will vary from 15% to 90% in the pulse mode of operations and from 5% to 60% in the capacitor mode of operations.

The select cutting mode switch determines whether the machine will be operating in capacitor or pulse mode with normal or reverse polarity.

A set of ten capacitor switches are provided, ranging from 12 down to 0.03 mfd, permitting up to 24.64 mfd to be placed in the circuit.

In the capacitor mode of operation, the energy stored in the capacitor bank discharges across the gap between the electrodes. Each spark causes a minute amount of material to be melted from the electrodes, and this material is quickly cooled by the cryogenic dielectric. It is estimated that the rate of cooling is approximately 1 million degress Celsius per second for powder particles of about 100 microns diameter. This results in unique microstructures of the powders. It has been found that the microstructure of the powder is clearly affected by the dielectric material used.

A typical setup for the South Bend-Ingersol Model 1000 EDM device used in the present invention is: gap=3, servo=8, frequency=0.4 (400 pulses per second), duty cycle=8, large capacitor mode, capacitance=23.5 mfd.

These settings were found to provide a high intensity discharge pulse and thus a high metal removal rate, desirable for creating powders from both the electrode and workpiece materials. Particles in the 50 to 300 micron range will be produced using either liquid nitrogen or liquid argon as the dielectric.

Experiments have been performed employing titanium electrodes and using both liquid argon and liquid nitrogen as the dielectric. Titanium machined in accordance with this process in liquid nitrogen produced powders, an analysis of which indicates that the liquid nitrogen reacted with the powders being formed, and the powders contained 12.5 wt % nitrogen (as titanium nitride dendrites). The same electrodes processed in liquid argon show only 1.5 wt % nitrogen content, probably present as a trace impurity in the liquid argon used.

After 6 hours of operation under the conditions listed above using five sheets of 0.010 inch thick Ti-6AL-4V sheet positioned above a 1.25 inch diameter Ti-6AL-4V rod, as illustrated in FIG. 3, in a liquid nitrogen dielectric, approximately 30 grams of Ti powder was produced having a mean diameter of 10 to 200 microns.

The unique microstructures of powders formed by the above-described process are illustrated clearly in the photomicrographs of FIGS. 4–7. These photomicrographs were formed by the following process.

The cryogenically solidified powder was allowed to air dry, then impregnated in finely ground diallyl phthalate, short glass. The samples were hand ground through a series of 8 inch diameter, 400 SiC grit, 600 SiC grit and 2400 SiC grit papers with $H_2O$. The samples were then intermediately polished on 8 inch diameter knapless paper (such as TEXMET brand manufactured by Buehler) with 3 micron diamond paste and oil lubricant. Final polishing was completed on microcloth with 0.06 micron colloidial silica.

The samples were then ultrasonically cleaned in ethanol for 5 minutes and dryed between each step to prevent carry-over contamination. Next, the samples were etched in Krolls Reagent (100 ml of $H_2O$, 6 ml of $HNO_3$, 2 mil of HF) by submerging the samples for approximately 5 seconds, and then by neutralizing the samples in sodium bicarbonate. The impregnated and polished samples were then carbon coated by vacuum deposition and photographed and observed in a scanning electron microscope.

Figure 4:
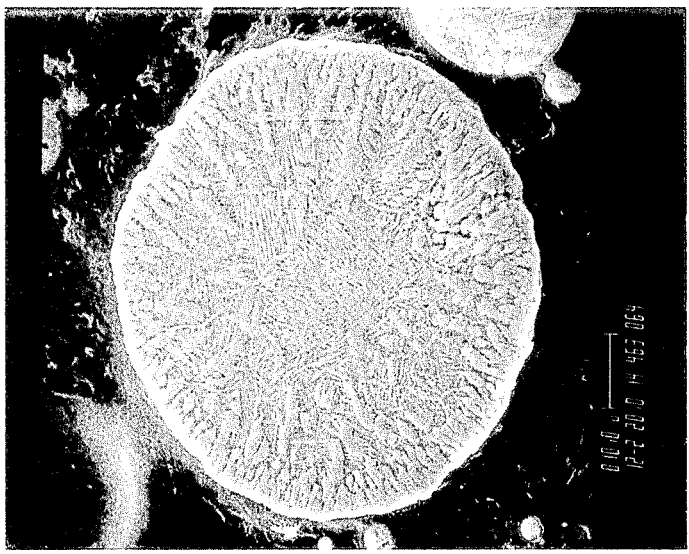
FIG. 4 is a photomicrograph of a spherical powder particle produced by machining in liquid argon.

FIG. 4 shows the internal microstructure of a spherical powder particle of Ti-6Al-4V produced by machining in liquid argon. The internal structure of this material is significantly different from the microstructure of the material from which the electrodes were formed.

Figure 5:
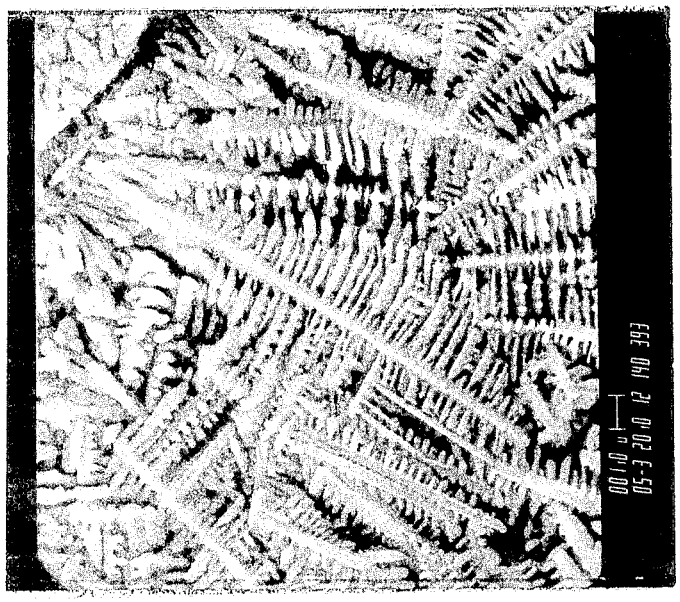
FIG. 5 is a photomicrograph showing the internal microstructure of a powder particle produced in liquid nitrogen.

FIG. 5 shows the internal microstructure of a Ti-6Al-4V powder particle produced by machining in liquid nitrogen. This photomicrograph was produced by selectively etching away the matrix of the dendrites of titanium nitride produced by a reaction between the titanium and the liquid nitrogen.

Figure 6:
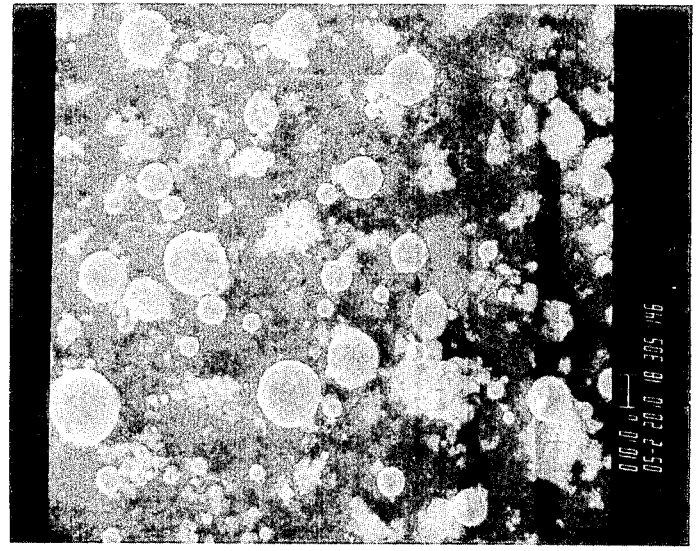
FIG. 6 is a photomicrograph showing spherical powder particles.

FIG. 6 shows many small, less than 10 microns, spherical powder particles of Ti-6Al-4V produced by machining under the following parameters: gap=1, servo=10, frequency=0.4, duty cycle=8, large capacitor mode, capacitance 23.5 mfd.

Figure 7:
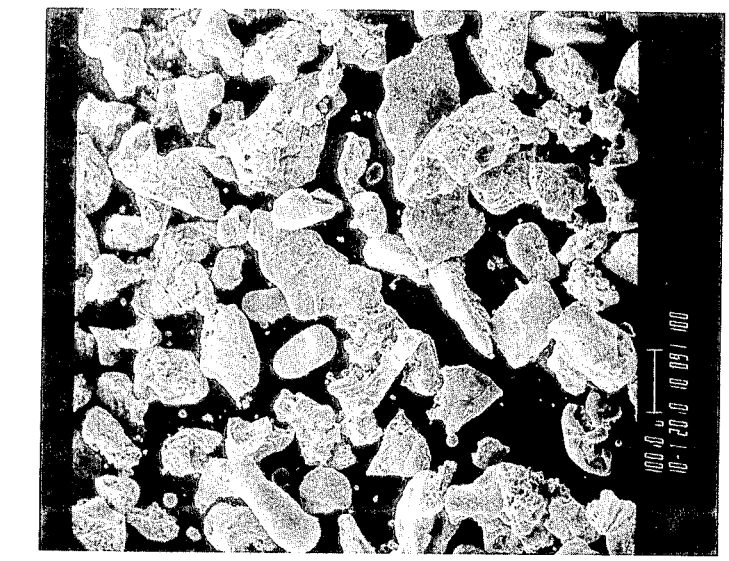
FIG. 7 is a photomicrograph showing larger, irregular particles produced when the operating parameters of the electro-discharge machining process are varied.

FIG. 7 shows larger Ti-6Al-4V powder particles (greater than 100 microns) which are irregular in morphology. These particles were produced by: gap=4, servo=7, frequency=0.4, duty cycle=4, large capacitor mode, capacitance 12.5 mfd.

The particles of FIG. 6 were produced in liquid argon, while the particles of FIG. 7 were produced in liquid nitrogen.

FIGS. 6 and 7 clearly illustrate how the size and shape of the particles produced by the machining process can be varied by controlling the operating parameters of the EDM device.

While the process, product and apparatus herein described constitute preferred embodiments of the invention, it is to be understood that the invention is not limited to this precise process, product and apparatus, and that changes may be made therein without departing from the scope of the invention which is defined in the appended claims.

What is claimed is:

1. A method for producing powders comprising the steps of
   electro-discharge machining conductive electrodes composed of the materials from which the powder is to be derived in an inorganic cryogenic dielectric until sufficient powder has been produced, thereafter allowing the dielectric to evaporate, and recovering the powder formed during machining.

2. The method of claim 1 wherein said electrodes are composed of metal.

3. The method of claim 1 wherein said cryogenic dielectric is inert.

4. The method of claim 1 wherein said cryogenic dielectric reacts with the materials forming the electrodes to form a desired compound of the electrode material.

5. Powders produced by the process of
   electro-discharge machining conductive electrodes composed of the materials from which the powder is to be derived in an inorganic cryogenic dielectric until sufficient powder has been produced, thereafter allowing the dielectric to evaporate, and recovering the powder formed during machining.

6. A method of producing uncontaminated metallic powders comprising the steps of:
   immersing spaced apart electrodes comprised of the metal from which powder is to be derived in a dielectric comprising an inert cryogenic liquid;
   supplying electrical current of sufficient intensity to the electrodes to cause sparking therebetween and thereby cause electro-erosion of said electrodes until a sufficient quantity of powder has been produced;
   allowing the cryogenic dielectric to evaporate; and
   recovering the uncontaminated metal powder.

7. Apparatus for making powder of controlled size including:
   means for providing a source of electrical current;
   a pair of spaced apart electrodes composed of the materials from which the powder is to be formed;
   means for connecting said electrodes to said source of electrical current;
   means for maintaining a dielectric composed of an inorganic cryogenic liquid above the level of the electrodes; and
   means for adjusting and maintaining the spacing between the electrodes as the electrodes are eroded due to arcing.

* * * * *